(12) United States Patent
Yin et al.

(10) Patent No.: US 9,398,171 B1
(45) Date of Patent: Jul. 19, 2016

(54) DEPLOYING A TOLL-FREE DATA SERVICE CAMPAIGN FOR SECURE CONTENT

(71) Applicant: Verizon Patent and Licensing Inc., Arlington, VA (US)

(72) Inventors: Fenglin Yin, Lexington, MA (US); Susan Kelly, Maynard, MA (US); Ajit Nair, Newton, MA (US); Zhong Chen, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/635,710

(22) Filed: Mar. 2, 2015

(51) Int. Cl.
*H04M 11/00* (2006.01)
*H04M 15/00* (2006.01)
*H04L 12/14* (2006.01)
*H04W 8/26* (2009.01)

(52) U.S. Cl.
CPC ....... *H04M 15/8083* (2013.01); *H04L 12/1442* (2013.01); *H04M 15/8033* (2013.01); *H04M 15/8214* (2013.01); *H04M 15/856* (2013.01); *H04W 8/26* (2013.01)

(58) Field of Classification Search
CPC ............... H04M 15/8083; H04M 15/8033; H04M 15/8214; H04M 15/856; H04L 12/1442; H04W 8/26
USPC .............. 455/406, 407, 411, 435.1; 348/115, 348/231.99; 709/209, 229; 705/3, 14.72
See application file for complete search history.

(56) References Cited

U.S. PATENT DOCUMENTS

| | | | |
|---|---|---|---|
| 2010/0198698 A1* | 8/2010 | Raleigh | G06Q 30/0601 705/26.1 |
| 2012/0155380 A1* | 6/2012 | Hodges | G06Q 30/00 370/328 |

* cited by examiner

*Primary Examiner* — Dhaval Patel

(57) ABSTRACT

A system may receive from a mobile device, a uniform resource identifier (URI) for accessing secure content associated with a toll-free data campaign for secure content ("campaign") from a content provider device. The system may identify traffic information included in the URI. The system may compare the traffic information with stored traffic information associated with the campaign and may determine that the traffic information is associated with the campaign if the traffic information matches the stored traffic information. The system may determine that an analysis of a transport layer socket (TLS) handshake, performed between the mobile device and the content provider device, was successful for the campaign. The system may provide information to cause data charges, for a traffic flow, to be charged to a content provider based on determining that the traffic information is associated with the campaign and that the TLS handshake analysis was successful.

20 Claims, 11 Drawing Sheets

100

DEPLOYING A TOLL-FREE DATA SERVICE CAMPAIGN FOR SECURE CONTENT

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that sponsors the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to the toll-free data service. A content provider may set up a toll-free data service campaign that describes parameters of a toll-free data service, such as a uniform resource identifier (URI) (e.g., a uniform resource locator (URL), a uniform resource name (URN), etc.) that may be used to access the toll-free data service. A network operator may use the parameters to deploy the toll-free data service campaign.

Deploying a toll-free data service campaign for hypertext transfer protocol secure (HTTPS) content, however, may prove challenging. A deployed toll-free data service campaign for HTTPS-secured content requires identifying a host name and a corresponding network address to charge the data usage to the content provider. HTTPS-secured content may be located behind a firewall, making discerning a host name and a corresponding network difficult.

Implementations described herein utilize a redirected host name dedicated to a deployed toll-free data service campaign for HTTPS-secured content. The redirected host name and corresponding network address may be visible, even with the presence of a firewall, for purposes of charging the content provider, for data usage made by a user of a mobile device accessing the HTTPS-secured content. The HTTPS-secured content may be received by a mobile device after a successful transport layer security (TLS) handshake sequence between the mobile device and the content provider, via a campaign enforcement device.

Figure 1:
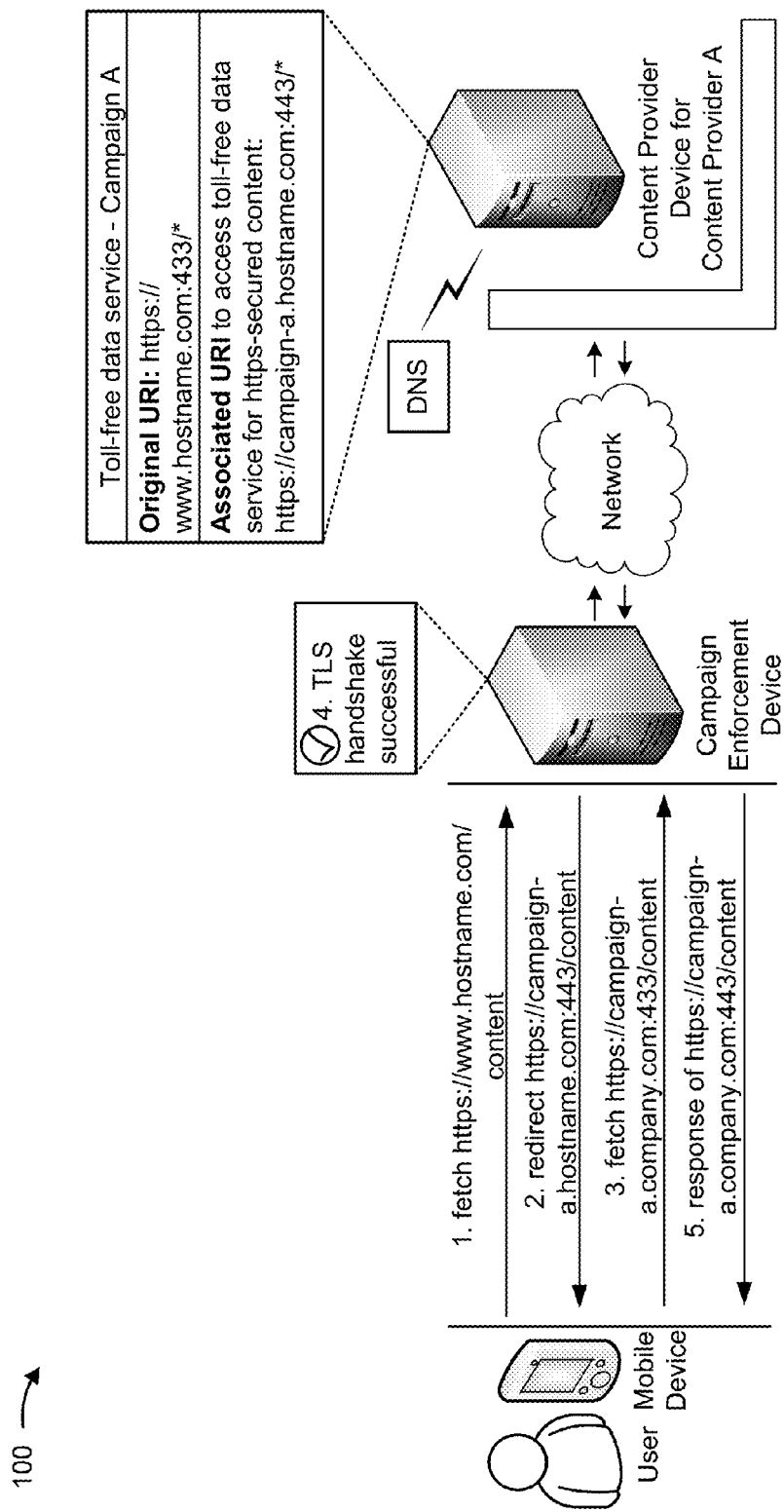
FIG. 1 is a diagram of an overview of an example implementation described herein.

FIG. 1 is a diagram of an overview of an example implementation 100 described herein. As shown in FIG. 1, a user of a mobile device may seek to fetch HTTPS-secured content, located behind a firewall, by sending a HTTPS request to a content provider, as shown by reference number 1, via a campaign enforcement device. For example, the user may send a request for the mobile device to fetch HTTPS-secured content at an original URI (e.g., https://www.hostname.com/content) associated with a content provider (e.g., Content Provider A).

Assume Content Provider A, as shown in FIG. 1, has a web site that supports a TLS protocol used to encrypt confidential data sent over an insecure network, such as the Internet. For example, for a web site with HTTPS-secured content, various types of data (e.g., a URL, a HTTP header, cookies, data submitted through forms, etc.) may be encrypted using public-key cryptography, also known as asymmetric cryptography.

Asymmetric cryptography requires using a pair of mathematically linked, authentication keys (i.e., a secret or private key and a public key). The public key is used to encrypt plaintext or to verify a digital signature. The private key is used to decrypt ciphertext or to create a digital signature. A digital certificate is associated with each key. A party, holding one key, may use the corresponding digital certificate to establish the party's identity with another party, holding the other key in the linked pair.

In FIG. 1, assume Content Provider A's website supports TLS server name indication protocol where the website may have multiple digital certificates. Each digital certificate may have a distinct subject name corresponding to a server name (or host name). For example, Content Provider A may have two digital certificates, a digital certificate (DC) with a subject name of www.company.com, and a digital certificate (DC-a) with a subject name of campaign-a.company.com.

Both host names may be resolved, using an internal domain name server (DNS), to a same list of Internet Protocol (IP) addresses. A web browser may establish separate TLS sessions corresponding to DC or DC-a based on TLS server name indication protocol. In preparing for a toll-free data service campaign (e.g., Campaign A), a content provider may designate a host name (e.g., https://campaign.a.company.com:433/*) for managing HTTPS-secured content. The content provider may provide to the campaign enforcement device an association between an original host name (e.g., https://www.hostname.com/content linked to DC) and the designated hostname (e.g., https://campaign.a.company.com:433/* linked to DC-a) established to redirect traffic flow to a toll-free data service associated with a deployed toll-free data service campaign.

As further shown in FIG. 1, the campaign enforcement device may recognize the request, made by the mobile device, as a request for HTTPS-secured content associated with the toll-free data service campaign. The campaign enforcement device may redirect the mobile device's request to a host name associated with the campaign, as shown by reference number 2. The mobile device may now fetch the redirected host name, as shown by reference number 3. The campaign enforcement device may perform a TLS handshake sequence, initiated by exchanging authentication keys and corresponding digital certificates between the mobile device and the content provider, as shown by reference number 4. After the campaign enforcement device verifies that the TLS handshake sequence was successful for the toll-free data service campaign, the content provider may provide a response to the request by the mobile device for the HTTPS-secured content, as shown by reference number 5, via the campaign enforcement device.

By using a redirected host name, dedicated to a deployed toll-free data service campaign for HTTPS-secured content, and a TLS handshake sequence to provide network security, the mobile device may receive HTTPS-secured content and the content provider may be charged for data usage associated with the HTTPS-secured content received by the mobile device.

While the description to follow will focus on HTTPS-secured content, the description may also apply to other types of secure content, such as content associated with File Transfer Protocol Secure (FTPS) or another secure communication protocol.

Figure 2:
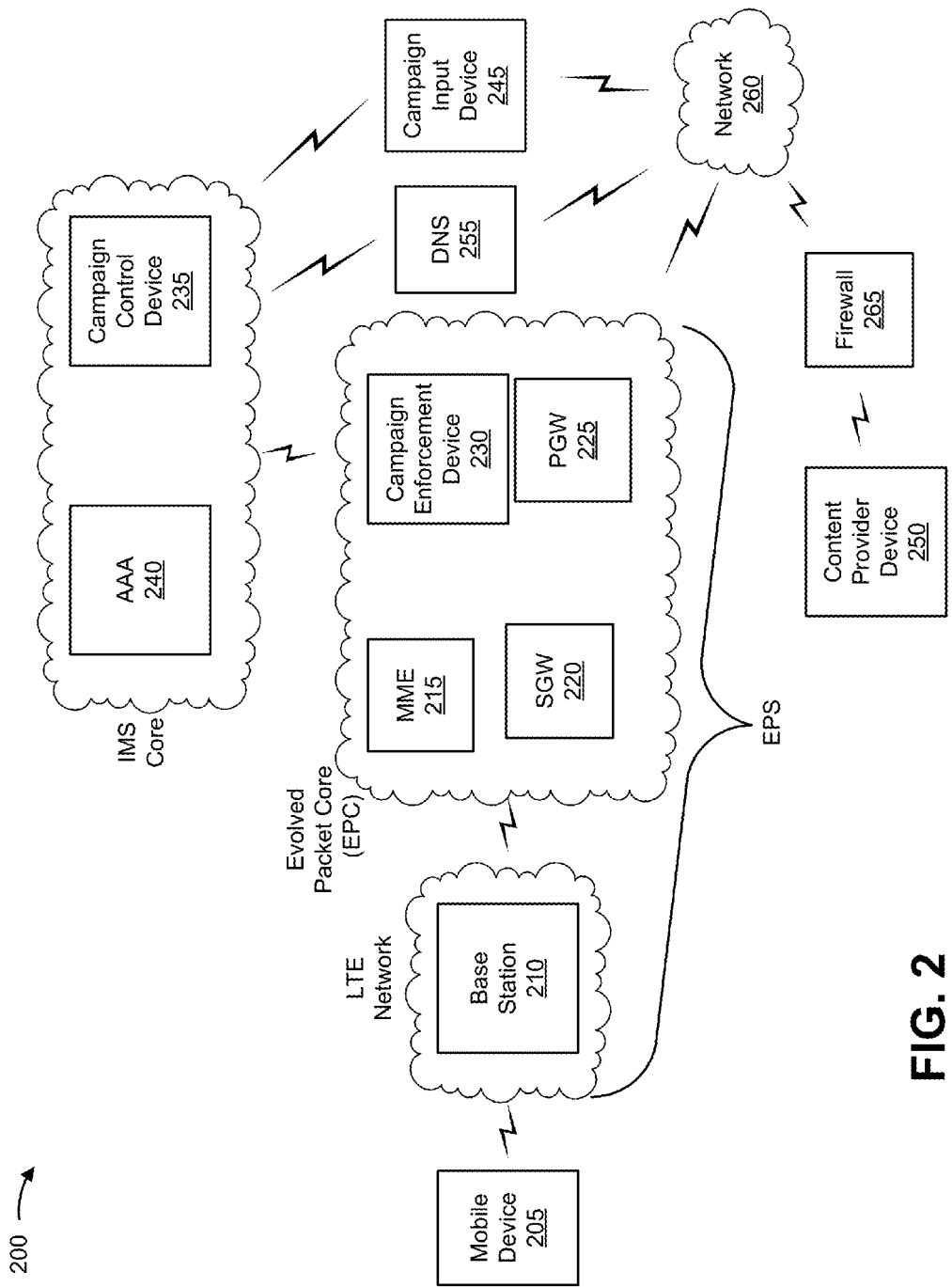
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a content provider device 250; a domain name server (DNS) 255; a network 260; and a firewall 265. Devices of environment 200 may interconnect via wired connections, wireless connections, or a combination of wired and wireless connections.

Some implementations are described herein as being performed within a long term evolution (LTE) network for explanatory purposes. Some implementations may be performed within a wireless network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and campaign enforcement device 230 that enable mobile devices 205 to communicate with network 260 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or content provider devices 250. Campaign control device 235 and/or AAA 240 may reside in the EPC and/or the IMS core.

Mobile device 205 may include one or more devices capable of communicating with base station 210 and/or a network (e.g., network 260). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar type of device. Mobile device 205 may send traffic to and/or receive traffic from network 260 (e.g., via base station 210, SGW 220, PGW 225, and/or campaign enforcement device 230).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 260 via SGW 220, PGW 225, and/or campaign enforcement device 230. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205 (via campaign enforcement device 230). MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225 and campaign enforcement device 230) and/or other network devices associated with the EPC and/or the IMS core. SGW 220 may also receive traffic from network 260 (via campaign enforcement device 230) and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 260 via campaign enforcement device 230. Additionally, or alternatively, PGW 225 may receive traffic from network 260 via campaign enforcement device 230, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server, an OADM, or a similar type of device. Campaign enforcement device 230 may receive campaign rules, including rules to redirect traffic flow from an original host name to a redirected hostname, associated with a toll-free data service campaign, from campaign control device 235. Additionally, or alternatively, campaign enforcement device 230 may apply the campaign rules to traffic received from PGW 225 and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, etc.). For example, campaign control device 235 may include a server or a similar type of device. Campaign control device 235 may receive campaign information from campaign input device 245, may generate campaign rules based on the campaign information, and may deploy the campaign rules to one or more campaign enforcement devices 230 (e.g., associated with one or more cellular service areas).

AAA 240 may include one or more devices, such as one or more servers, that perform authentication, authorization, and/or accounting operations for communication sessions associated with mobile device 205. For example, AAA 240 may store data usage information for mobile device 205, for a user associated with mobile device 205, for content provider device 250, for a content provider (e.g., that provides a toll-free data service), or the like.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server, or a similar type of device. Campaign input device 245 may receive input, from a content provider, that identifies campaign information, and may provide the campaign information to campaign control device 235.

Content provider device 250 may include one or more devices capable of providing content (e.g., to mobile device 205). For example, content provider device 250 may include a server (e.g., a host server, a web server, an application server, etc.) or a similar type of device. Content provider device 250 may be associated with a content provider that provides a toll-free data service, where the content provider is charged for data usage rather than an end user associated with mobile device 205.

DNS 255 may include one or more devices capable of translating a host name (e.g., a domain name) into a network address (e.g., an Internet protocol (IP) address). For example, DNS 255 may include a server or a similar type of device. DNS 255 may receive information that identifies a host name (e.g., from campaign control device 235), and may provide information that identifies a network address mapped to the host name. DNS 255 may store a data structure that maps host names to network addresses.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Firewall 265 may include a network device that provides security measures on behalf of content provider device 250. For example, firewall 265 may control access to content provider device 250. In one implementation, firewall 265 may act as a proxy for content provider device 250. Firewall 265 may connect to content provider device 250 and network 260 via wired and/or wireless connection(s).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
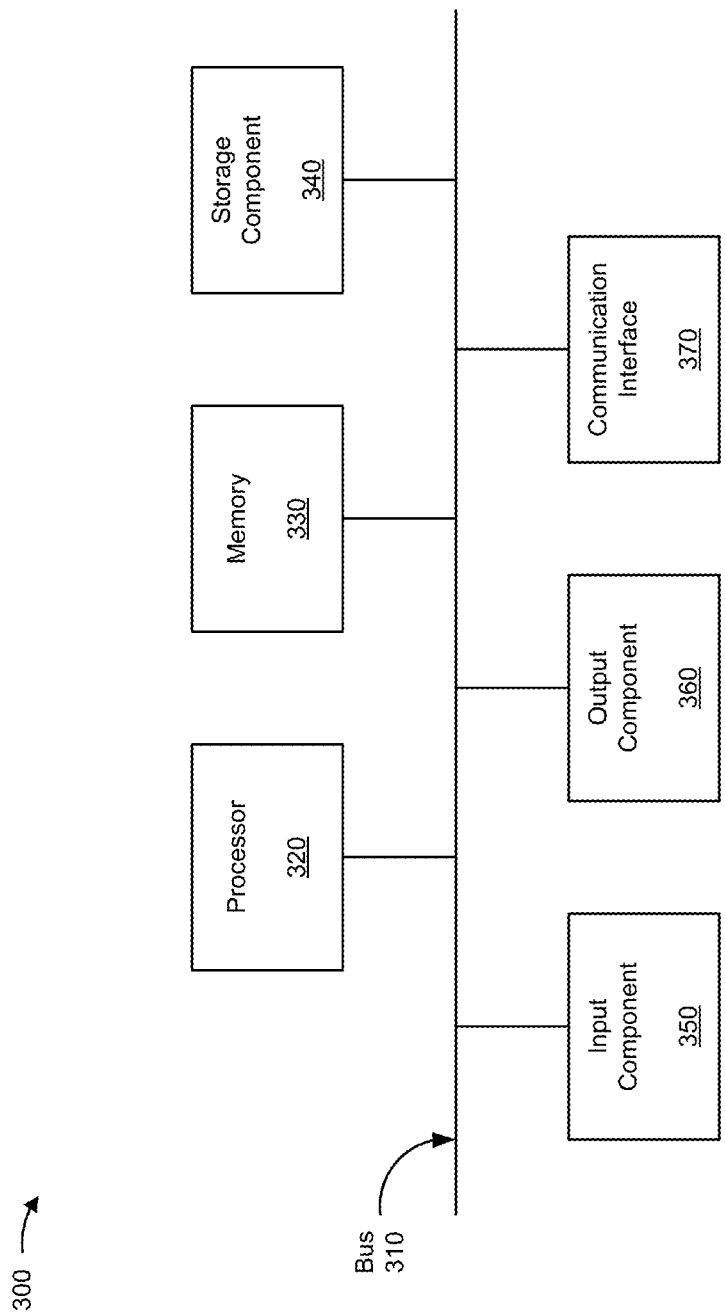
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, content provider device 250, DNS 255, and/or firewall 265. In some implementations, mobile device 205, base station 210, MME 215, SGW 220, PGW 225, campaign enforcement device 230, campaign control device 235, AAA 240, campaign input device 245, content provider device 250, DNS 255, and/or firewall 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
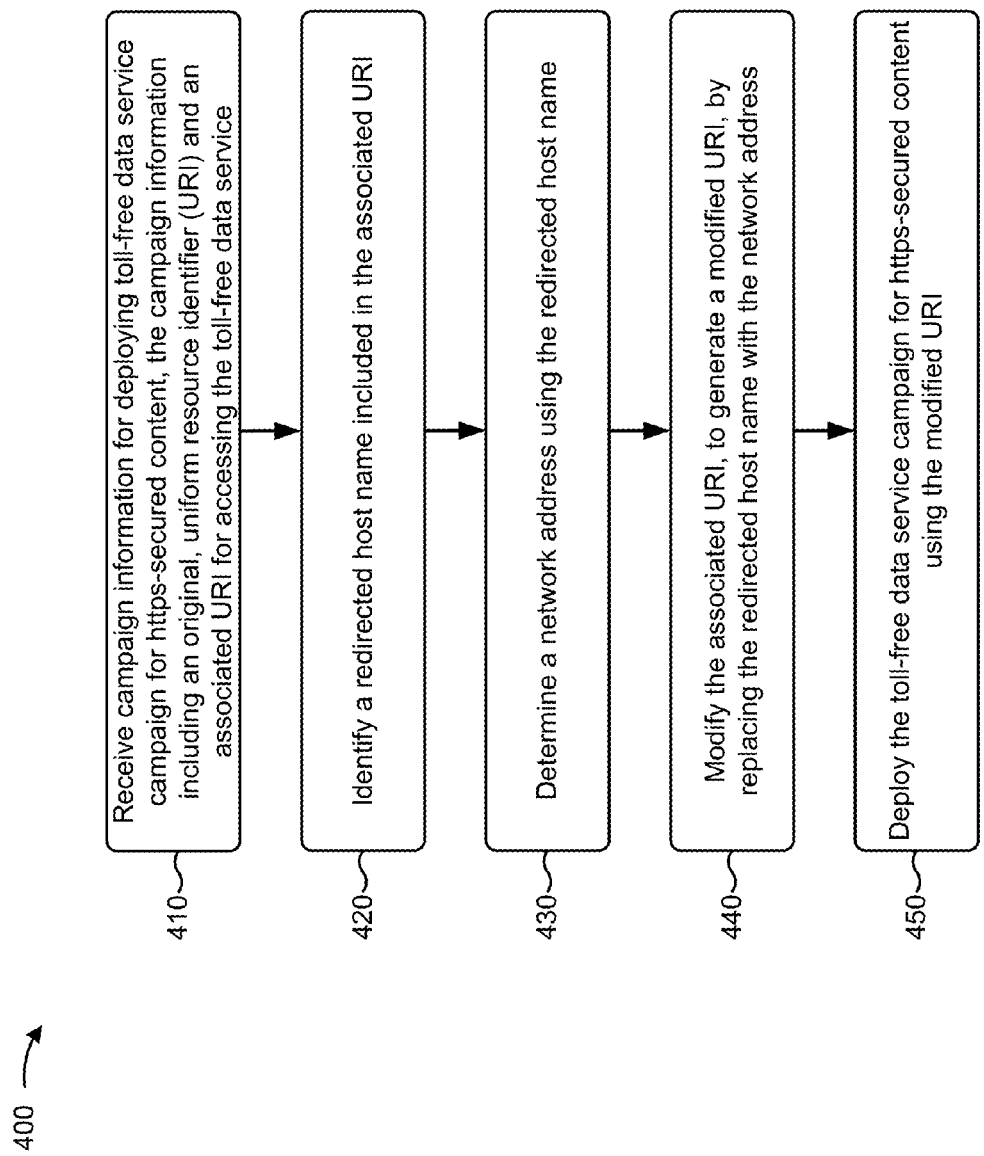
FIG. 4 is a flow chart of an example process for deploying a toll-free data service campaign for HTTPS-secured content.

FIG. 4 is a flow chart of an example process 400 for deploying a toll-free data service campaign for HTTPS-secured content. In some implementations, one or more process blocks of FIG. 4 may be performed by campaign control device 235. In some implementations, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, content provider device 250, DNS 255, and/or firewall 265.

As shown in FIG. 4, process 400 may include receiving campaign information for deploying a toll-free data service campaign for HTTPS-secured content, the campaign information including an original uniform resource identifier (URI) and an associated URI for accessing the toll-free data service (block 410). For example, campaign control device 235 may receive campaign information for deploying a toll-free data service campaign for HTTPS-secured content. A toll-free data service campaign for HTTPS-secured content (sometimes referred to herein as a campaign) may refer to a campaign by a content provider where the content provider agrees to be charged for data usage by users of mobile devices 205 that access content provided by the content provider (e.g., rather than the users being charged for the data usage).

Campaign information may include, for example, information that identifies an original URI and an associated URI via which a toll-free data service may be accessed. The original URI and the associated URI may be linked so that a user of mobile device 205 trying to access HTTPS-secured content using the original URI may be redirected to the associated URI, set up by the content provider, dedicated to managing HTTPS-secured content. Campaign information may also include, for example, information that identifies a content provider associated with a campaign, information that identifies one or more content provider devices 250 that provide content associated with a campaign, information that identifies a geographic region associated with a campaign, information that identifies a time period during which a campaign is valid, information that identifies an amount of data (e.g., in bytes) that the content provider will pay for during the campaign (e.g., a maximum amount of data), or the like.

The original URI and/or the associated URI may include, for example, a uniform resource locator (URL), a uniform resource name (URN), or the like. Additionally, or alternatively, the original URI and/or the associated URI may include, for example, a full URI path (e.g., a full URL path, a full URN path, etc.), a partial URI path (e.g., a URL prefix, a URL suffix, a URN prefix, a URN suffix, etc.), or the like. Additionally, or alternatively, the campaign information may include multiple original URIs and multiple associated modified URIs via which the toll-free data service may be accessed. In some implementations, a user associated with the content provider may input campaign information using campaign input device 245, and campaign input device 245 may provide the campaign information to campaign control device 235.

In some implementations, campaign enforcement device 230 may receive an associated URI without performing a redirect. For example, content provider device 250 may receive the request from mobile device 205 to access HTTPS-secured content. Content provider device 250 may redirect mobile device 205 to the associated URI rather than the redirect being performed by the content enforcement server 230. Additionally, or alternatively, campaign enforcement device 230 may receive campaign rules to permit a user access to the toll-free data service when campaign enforcement device 230 receives traffic from mobile device 205, including traffic information for the associated URI.

As further shown in FIG. 4, process 400 may include identifying a redirected host name included in the associated URI (block 420), and determining a network address using the redirected host name (block 430). For example, campaign control device 235 may identify a redirected host name included in the associated URI. A redirected host name may refer to a new label that is assigned to a device connected to a network (e.g., network 260) to identify the device (e.g., in a particular form of electronic communication, such as the World Wide Web, e-mail, etc.) as dedicated to a toll-free data service campaign for HTTPS-secured content. For example, a redirected host name may include a domain name. A redirected host name may include a top-level domain, a second-level domain, a third-level domain, a full host name, a host name prefix, a host name suffix, or the like.

Campaign control device 235 may determine a network address using the redirected host name. For example, campaign control device 235 may provide information identifying the redirected host name to DNS 255. DNS 255 may use the redirected host name to search a data structure to identify a network address associated with the redirected host name. A network address may identify a device associated with the redirected host name. For example, the network address may include an IP address, a media access control (MAC) address, or the like, that identifies content provider device 250 that provides a toll-free data service.

Additionally, or alternatively, the network address may identify a port via which the toll-free data service is provided. In some implementations, a single redirected host name may correspond to multiple network addresses that identify multiple respective content provider devices 250 (e.g., associated with geographically distributed web services). DNS 255 may provide information identifying the network address to campaign control device 255. In some implementations, campaign control device 235 may identify multiple redirected host names associated with multiple URIs, and may determine one or more respective network addresses for each redirected host name. Additionally, or alternatively, the one or more respective network addresses may correspond to one or more respective storage locations for secure content associated with one or more content provider devices 250.

As further shown in FIG. 4, process 400 may include modifying the associated URI, to generate a modified URI, by replacing the redirected host name with the network address (block 440), and deploying the toll-free data service campaign for HTTPS-secured content using the modified URI (block 450). For example, campaign control device 235 may modify the associated URI, to generate a modified URI, by replacing the redirected host name in the associated URI with the network address received from DNS 255. In some implementations, campaign control device 235 may replace a service identifier (e.g., a host name), included in the associated URI, with a device identifier (e.g., a network address). Campaign control device 235 may deploy the toll-free data service campaign for HTTPS-secured content using the modified URI.

Campaign control device 235 may deploy the toll-free data service campaign by providing campaign rules, based on the campaign information, that instruct campaign enforcement device(s) 230 how to handle network traffic, to campaign enforcement device(s) 230 associated with the campaign. For example, the campaign rules may identify a geographic region in which the campaign is to be deployed. Campaign control device 235 may identify campaign enforcement devices 230 located in the geographic region, and may provide campaign rules to the identified campaign enforcement devices 230.

Additionally, or alternatively, the campaign rules may identify one or more URIs associated with a toll-free data service. Campaign control device 235 may modify the URI (s), by replacing a host name in each associated URI with one or more network addresses that correspond to the host name, and may provide the modified URI(s) to campaign enforcement devices 230 so that campaign enforcement devices 230 may identify traffic to be treated as toll-free (e.g., data usage for the traffic flow to be charged to the content provider).

Additionally, or alternatively, the campaign rules may identify a time period during which the toll-free data service is valid, and campaign control device 235 may provide information that identifies the time period to campaign enforcement devices 230 so that campaign enforcement devices 230 may determine a time period during which to treat traffic as toll-free. Additionally, or alternatively, the rules may identify a quantity of data (e.g., in bytes) to be allocated to a toll-free data service, and campaign control device 235 may allocate some of the data to each of the identified campaign enforcement devices 230 so that campaign enforcement devices 230 may determine whether there is available data to be allocated to treat traffic as toll-free.

Campaign control device 235 may generate campaign rules based on the campaign information, in some implementations. A campaign rule may specify one or more campaign conditions for charging a content provider for data used by a mobile device to access HTTPS-secured content associated with a toll-free data service, as described in more detail elsewhere herein. Campaign control device 235 may combine the generated campaign rules into a configuration file, and may provide the configuration file to one or more campaign enforcement devices 230 when deploying the campaign.

Additionally, or alternatively, campaign control device 235 may provide a notification when campaign deployment has been completed. For example, campaign control device 235 may provide a notification to the content provider (e.g., via an email address, via campaign input device 245, via content provider device 250, etc.). By implementing process 400, campaign control device 235 may increase a speed at which toll-free data service campaigns may be implemented (e.g., by reducing or eliminating DNS look-ups performed by individual campaign enforcement devices 230; by more quickly determining, by an individual campaign enforcement device 230, if a TCP/TLS flow is needed; etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
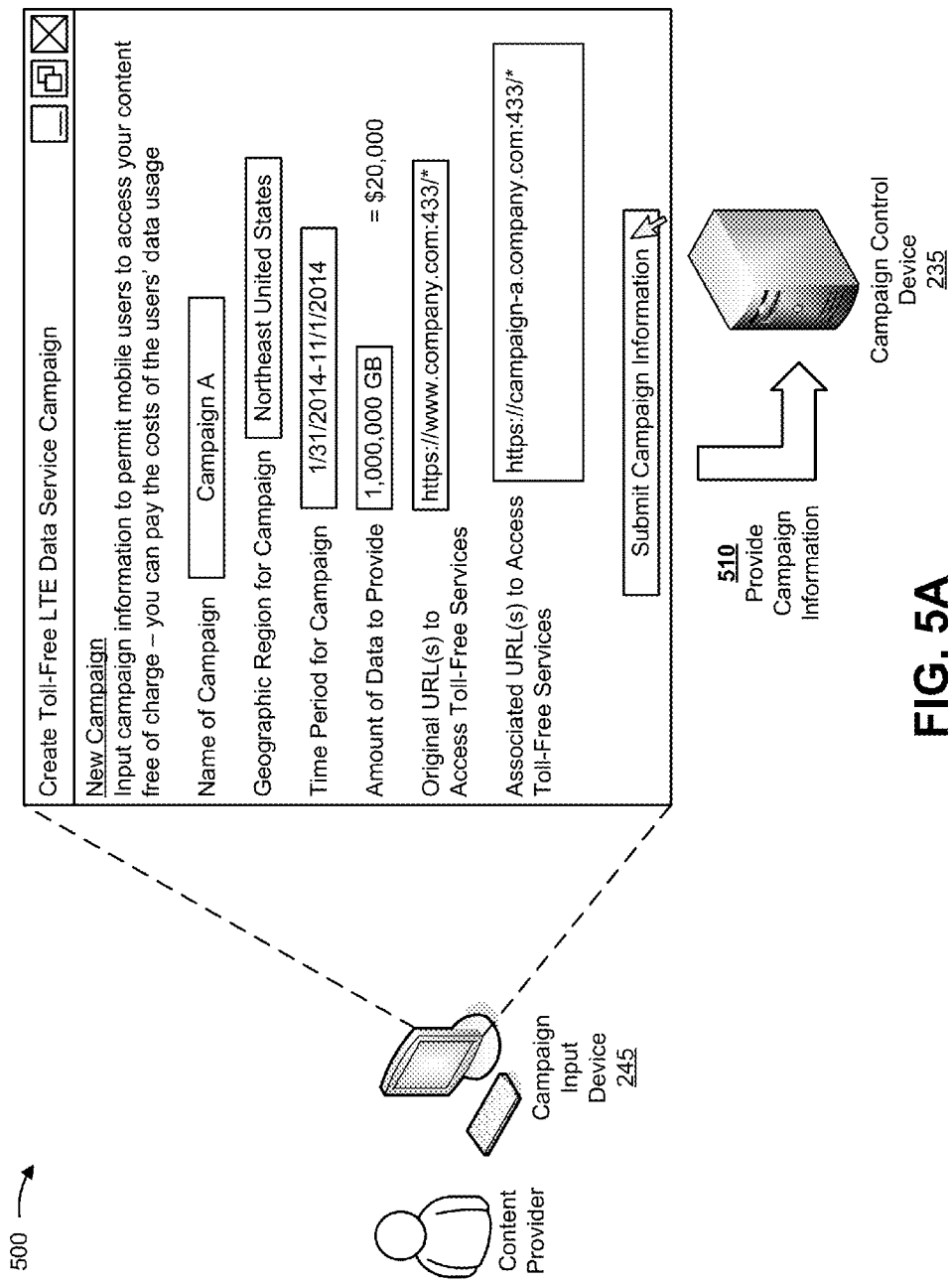
FIGS. 5A-5C are diagrams of an example implementation relating to the example process shown in FIG. 4.
Figure 5B:
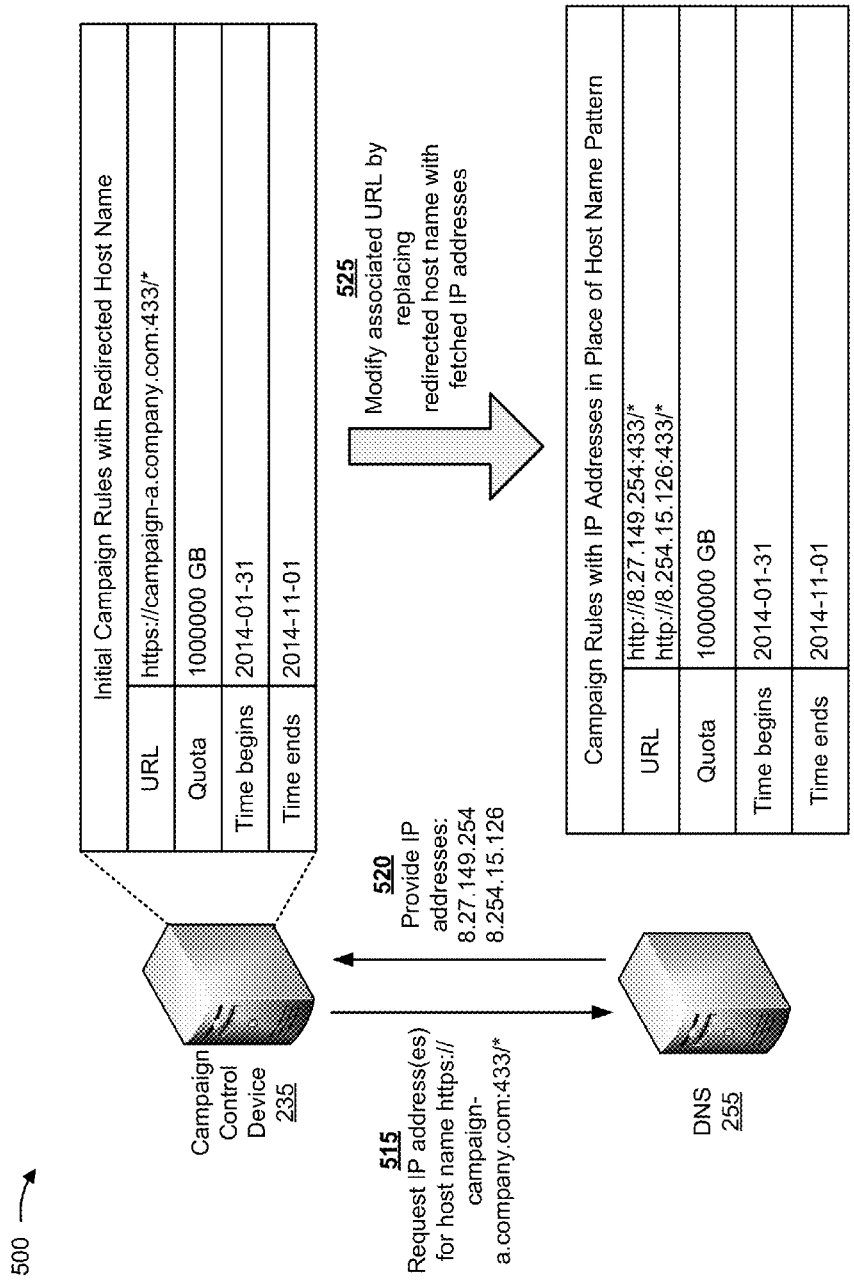
Figure 5C:
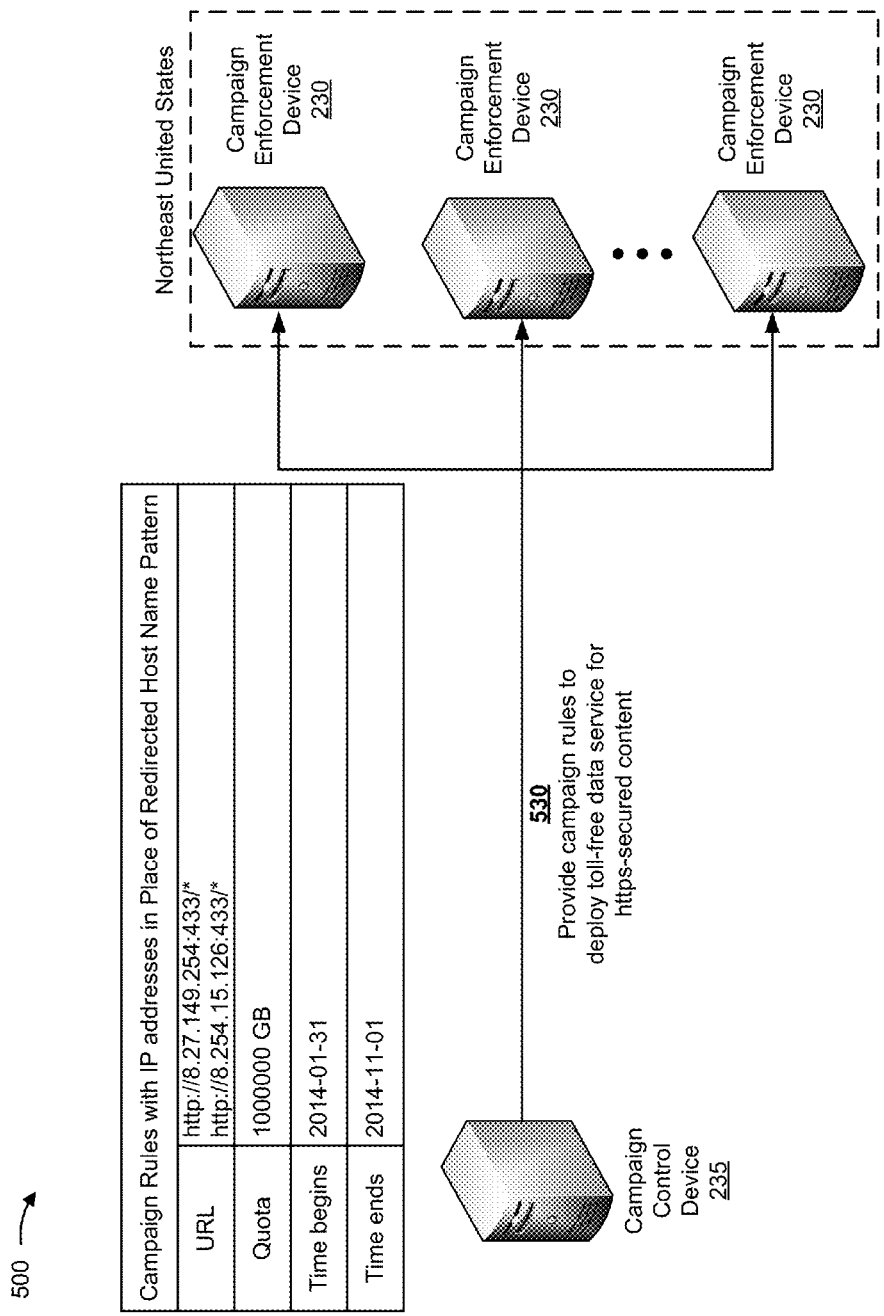

FIGS. 5A-5C are diagrams of an example implementation 500 relating to example process 400 shown in FIG. 4. FIGS. 5A-5C show an example of deploying a toll-free data service campaign for HTTPS-secured content.

As shown in FIG. 5A, and by reference number 505, assume that a content provider interacts with campaign input device 245 to input campaign information to create a toll-free LTE data service campaign. As shown, assume that the content provider inputs a name of the campaign (e.g., a campaign identifier), shown as "Campaign A," a geographic region for the campaign, shown as "Northeast United States," a time period for the campaign, shown as "1/31/2014-11/1/2014," an amount of data (e.g., a maximum amount) to be provided with the campaign, shown as "1,000,000 gigabytes (GB)," which corresponds to a payment of $20,000 by the content provider, an original URL that may be submitted by mobile device 205 to access the HTTPS-secured content, shown as "https://www.company.com:433/*," and an associated URL to access the HTTPS-secured content associated with a toll-free data service, shown as "https://campaign-a.company-.com:433/*." Assume that the asterisk (*) represents a wildcard character, and stands for a string of zero or more characters.

As further shown, assume that the content provider interacts with an input mechanism, shown as a "Submit Campaign Information" button, to cause campaign input device 245 to provide the campaign information to campaign control device 235, as shown by reference number 510.

As shown in FIG. 5B, and by reference number 515, assume that campaign control device 235 requests IP addresses, for the redirected host name "https://campaign-a.company.com:433/*," from DNS 255. As shown by reference number 520, assume that DNS 255 searches a data structure, using the redirected host name, to identify two IP addresses associated with the host name, shown as "8.27.149.254" and "8.254.15.126." Assume that DNS 255 provides these two IP addresses to campaign control device 235. As shown by reference number 525, assume that campaign control device 235 uses the IP addresses to generate two modified URLs, by replacing the redirected host name with the IP addresses. As shown, assume that the two modified URLs are "HTTPS://8.27.149.254:433/*" and "HTTPS://8.254.15.126:433/," where 443 represents a port identifier for HTTPS-secured content that uses a TCP/TLS security protocol and * represents a wildcard to include all URL paths associated with the toll-free data service campaign.

As shown in FIG. 5C, and by reference number 530, assume that campaign control device 235 deploys Campaign A by providing campaign rules for Campaign A (e.g., generated based on the campaign information received from campaign input device 245) to each campaign enforcement device 230 located in the Northeast United States. Assume that the campaign rules identify the modified URLs generated by campaign control device 235. Campaign enforcement devices 230 may use the modified URLs to identify toll-free data service traffic for HTTPS-secured content, as described in more detail elsewhere herein As indicated above, FIGS. 5A-5C are provided merely as an example. Other examples are possible and may differ from what was described with regard to FIGS. 5A-5C.

Figure 6:
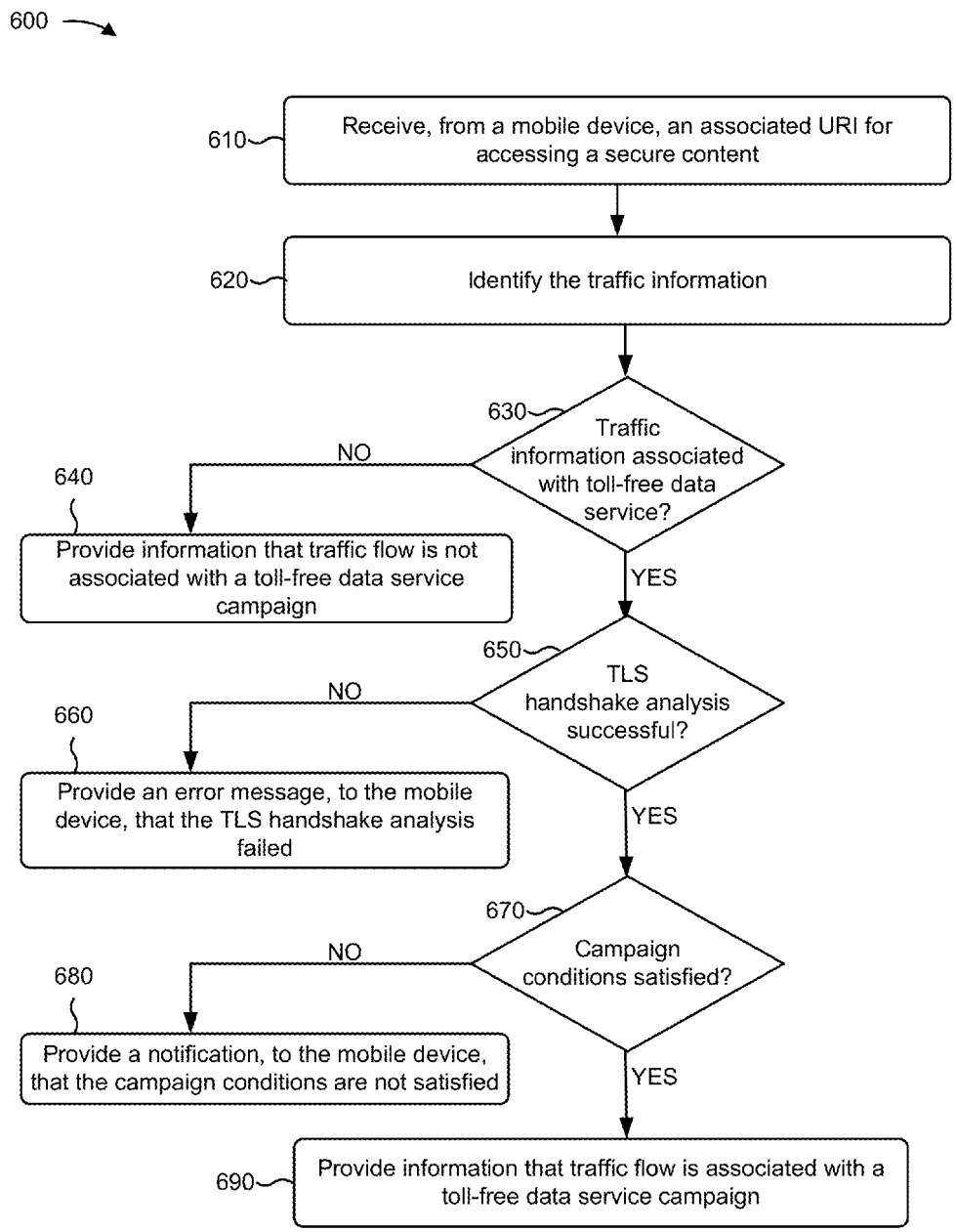
FIG. 6 is a flow chart of an example process for implementing a deployed toll-free data service campaign for HTTPS-secured content.

FIG. 6 is a flow chart of an example process 600 for implementing a deployed toll-free data service campaign. In some implementations, one or more process blocks of FIG. 6 may be performed by campaign enforcement device 230. In some implementations, one or more process blocks of FIG. 6 may be performed by another device or a group of devices separate from or including campaign enforcement device 230, such as mobile device 205, base station 210, MME 215, SGW 220, PGW 225, campaign control device 235, AAA 240, campaign input device 245, content provider device 250, DNS 255, and/or firewall 265.

As shown in FIG. 6, process 600 may include receiving, from a mobile device, an associated URI for accessing secure content (block 610). For example, campaign enforcement device 230 may receive, from mobile device 205 (e.g., via PGW 225), a request to access secure content (e.g., a HTTPS request, a FTPS request, a secure access request, etc.) associated with a toll-free data service. The request may identify secure content using a URI. Campaign enforcement device 230 may determine that the URI, included in the request from mobile device 205 to access HTTPS-secured content, has an associated URI designated by a content provider, via which the secure content is available. Additionally, or alternatively, campaign enforcement device 230 may redirect mobile device 205 to the associated URI. Additionally, or alternatively, campaign enforcement device 230 may receive a second request from mobile device 205 to access secure content using the associated URI. The associated URI may include traffic information, such as a network address and a port identifier that identifies a device that provides the secure content.

As shown in FIG. 6, process 600 may include identifying the traffic information (block 620). For example, campaign enforcement device 230 may identify traffic information that identifies the device that provides the secure content. Campaign enforcement device 230 may read from particular fields of packets carrying the traffic information to identify specific traffic information, such as a network address and a port identifier.

As further shown in FIG. 6, process 600 may include determining whether the traffic information is associated with a toll-free data service (block 630). For example, campaign enforcement device 230 may analyze the traffic information to determine whether the traffic information is associated with a toll-free data service for HTTPS-secured content. In some implementations, campaign enforcement device 230 may compare the traffic information to stored traffic information marked as being associated with a toll-free data service for HTTPS-secured content. If the received traffic information (e.g., included in the associated URI received from mobile device 205) matches the stored traffic information, then campaign enforcement device 230 may determine that the traffic information is associated with a toll-free data service for HTTPS-secured content. If the received traffic information does not match the stored traffic information, then campaign enforcement device 230 may determine that the traffic information is not associated with a toll-free data service for HTTPS-secured content.

As further shown in FIG. 6, if the traffic information is not associated with a toll-free data service (block 630—No), then process 600 may provide information that traffic flow is not associated with a toll-free data service campaign (block 640). For example, campaign enforcement device 230 may inspect TLS handshake records (e.g., a client hello message, a sever hello message, a server certificate message, a client certificate message, etc.) generated for a TLS handshake analysis between mobile device 205 and content provider device 250. If the TLS handshake analysis was successful, based on the TLS handshake records, campaign enforcement device 230 may provide information to PGW 225 and/or another device that the traffic flow is not associated with a toll-free data service for HTTPS-secured content, causing the data usage for the traffic flow to be charged to mobile device 205 (e.g., and/or a user associated with mobile device 205).

In some implementations, campaign enforcement device 230 may mark the traffic flow and/or packets associated with the traffic flow as not being associated with a toll-free data service for HTTPS-secured content. In some implementations, campaign enforcement device 230 may ignore the traffic flow and/or packets associated with the traffic flow. In some implementations, campaign enforcement device 230 may mark the traffic flow and/or packets only if the traffic flow is associated with a toll-free data service for HTTPS-secured content. In some implementations, campaign enforcement device 230 may provide instructions to PGW 225 to mark the traffic flow and/or packets associated with the traffic flow as not being associated with a toll-free data service for HTTPS-secured content.

Additionally, or alternatively, PGW 225 and/or campaign enforcement device 230 may count a quantity of data (e.g., in bytes) used in association with the traffic flow, and may provide data usage information (e.g., that identifies a quantity of data used) to AAA 240. In some implementations, campaign enforcement device 230 and/or PGW 225 may provide an instruction, to AAA 240, that causes the data usage information to be charged to mobile device 205.

As further shown in FIG. 6, if the traffic information is associated with a toll-free data service (block 630—Yes), then process 600 may include determining whether a TLS handshake analysis was successful (block 650). For example, campaign enforcement device 230 may inspect TLS handshake records (e.g., a client hello message, a sever hello message, a server certificate message, a client certificate message, etc.) generated for a TLS handshake between mobile device 205 and content provider device 250. In some implementations, campaign enforcement device 230 may parse a server hello message for a TLS session identifier (SID) if the server hello message was successfully provided during the TLS handshake. Additionally, or alternatively, campaign enforcement device 230 may create a map with information (e.g., the SID, a message disposition notification (MDN), a source IP address, a source port, a destination IP address, a destination port, a protocol, etc.) for a traffic flow between mobile device 205 and content provider device 250. If the server hello message was not successfully provided, the TLS handshake analysis may fail. This is one example of a TLS handshake analysis failing. A TLS handshake analysis may fail for other reasons.

Additionally, or alternatively, campaign enforcement device 230 may parse a server digital certificate for a host name if the server digital certificate was successfully provided created during the TLS handshake. Additionally, or alternatively, campaign enforcement server 230 may determine whether the traffic information, identified in block 620, and the host name are associated with a toll-free data service for HTTPS-secured content.

For example, campaign enforcement device 230 may compare the traffic information and host name to stored traffic information and a stored host name, marked as being associated with a toll-free data service for HTTPS-secured content. If the traffic information and the host name match the stored traffic information and the stored host name, then campaign enforcement device 230 may update the map with additional information (e.g., the SID, the MDN, the source IP address, the source port, the destination IP address, the destination port, the protocol, etc.) and associate a traffic flow for the HTTPS-secured content with a toll-free data service campaign for HTTPS-secured content. If there is no match, then campaign enforcement device 230 may determine that the TLS handshake analysis was not successful and the traffic flow is not associated with the HTTPS-secured content for a toll-free data service campaign. This is one example of a TLS handshake analysis failing. A TLS handshake analysis may fail for other reasons.

As further shown in FIG. 6, if the TLS handshake analysis was not successful (block 650—No), then process 600 may include providing an error message, to the mobile device, that the TLS handshake analysis failed (block 660). For example, if campaign enforcement device 230 determines that the TLS handshake analysis was not successful, then campaign enforcement device 230 may notify mobile device 205 that the TLS handshake analysis failed. The error message may indicate a reason that the TLS handshake analysis failed (e.g., a client hello message not received, a server hello message not received, a host name in a server certificate message did not match a toll-free data service campaign, etc.). Mobile device 205 may provide the error message for display so that a user may understand why the toll-free data service is not being provided.

As further shown in FIG. 6, if the TLS handshake analysis was successful (block 650—Yes), then process 600 may include determining whether campaign conditions are satisfied (block 670). For example, if campaign enforcement device 230 determines that the traffic information is associated with HTTPS-secured content for a toll-free data service campaign, then campaign enforcement device 230 may determine whether one or more campaign conditions are satisfied. A campaign condition may be identified in a campaign rule received from campaign control device 235 during deployment of a toll-free data service campaign.

As an example, a campaign condition may specify a time period during which a campaign is valid. If the request to access HTTPS-secured content associated with the toll-free data service is received during the time period, then the campaign condition may be satisfied. If the request to access HTTPS-secured content associated with the toll-free data service is not received during the time period, then the campaign condition may not be satisfied. As another example, a campaign condition may specify a geographic region in which the campaign is valid. If the request to access HTTPS-secured content associated with the toll-free data service is received from the geographic region, then the campaign condition may be satisfied. If the request to request to access HTTPS-secured content associated with the toll-free data service is not received from the geographic region, then the campaign condition may not be satisfied.

As another example, a campaign condition may specify a quantity of bytes reserved for a campaign. Campaign enforcement device 230 and/or PGW 225 may determine whether there are any bytes, out of the original reserved amount of bytes, available to be allocated to the request to access HTTPS-secured content associated with the toll-free data service. For example, campaign enforcement device 230 may periodically request and/or may periodically receive, from campaign control device 235, information that identifies a quantity of available bytes. Campaign control device 235 may receive information regarding used bytes from one or more campaign enforcement devices 230, and may update the quantity of available bytes based on the received information. If there are available bytes to be allocated to the request to access HTTPS-secured content associated with the toll-free data service, then the campaign condition may be satisfied.

If there are no available bytes (or not enough available bytes) to be allocated to the HTTPS-secured content for the toll-free data service, then campaign enforcement device 230 may request additional bytes from campaign control device 235. Additionally, or alternatively, campaign enforcement device 230 may receive additional bytes from campaign control device 235 with or without sending a request. When campaign enforcement device 230 determines that there are enough available bytes to meet the request, campaign enforcement device 230 may determine that the campaign condition is satisfied. If campaign control device 235, however, does not allocate additional bytes to the request to access the toll-free data service for HTTPS-secured content, then the campaign condition may not be satisfied.

As another example, a campaign condition may be satisfied when a campaign is not marked as paused, and may not be satisfied when the campaign is marked is paused. In some implementations, campaign control device 235 and/or campaign enforcement device 230 may mark a campaign as paused based on information received from campaign input device 245. For example, a content provider may wish to pause a campaign, and may provide an instruction to pause the campaign using campaign input device 245. In some implementations, campaign enforcement device 235 may determine whether multiple campaign conditions, described herein, are satisfied.

As further shown in FIG. 6, if the campaign conditions are not satisfied (block 670—No), then process 600 may include providing a notification, to the mobile device, that the campaign conditions are not satisfied (block 680). For example, if campaign enforcement device 230 determines that the campaign conditions are not satisfied, then campaign enforcement device 230 may notify mobile device 205 that the campaign conditions are not satisfied. The notification may indicate a reason that the campaign conditions were not satisfied, in some implementations (e.g., not enough available bytes, a request during an invalid time period, the campaign has been paused by the content provider, etc.). Mobile device 205 may provide the notification for display so that a user may understand why the toll-free data service is not being provided.

In some implementations, the notification may provide an option for the user to access the requested service at the user's expense (e.g., indicating that the user will be charged for data usage associated with the requested service). If the user agrees to accept data charges, then campaign enforcement device 230 may provide information that traffic flow is not associated with a toll-free campaign data service. In some implementations, campaign enforcement device 230 may mark the traffic flow and/or packets associated with the traffic flow as not being associated with a toll-free data service for HTTPS-secured content. Additionally, or alternatively, PGW 225 and/or campaign enforcement device 230 may count a quantity of data (e.g., in bytes) used in association with the traffic flow, and may provide data usage information (e.g., that identifies a quantity of data used) to AAA 240. In some implementations, campaign enforcement device 230 and/or PGW 225 may provide an instruction, to AAA 240, that causes the data usage information to be charged to mobile device 205. Additionally, or alternatively, campaign enforcement device 230 may prevent a traffic flow that charges a content provider associated with the toll-free data service from being established.

As further shown in FIG. 6, if the campaign conditions are satisfied (block 670—Yes), then process 600 may include providing information that a traffic flow is associated with the toll-free data service campaign (block 690). For example, if campaign enforcement device 230 determines that the campaign conditions are satisfied, then campaign enforcement device 230 may provide information that causes a traffic flow, that charges data usage to a content provider associated with the toll-free data service, to be established (e.g., a content provider identified in campaign information for deploying the toll-free data service, a content provider that input the campaign information, a content provider associated with the secure content, etc.). In some implementations, campaign enforcement device 230 may mark the traffic flow and/or packets associated with the traffic flow as being associated with a toll-free data service.

As an example, campaign enforcement device 230 may provide information to PGW 225 to mark packets, associated with the traffic flow so that the content provider can be charged for data usage associated with the requested service. PGW 225 may route traffic (e.g., packets) associated with the requested service. Additionally, or alternatively, PGW 225 and/or campaign enforcement device 230 may count a quantity of data (e.g., in bytes) used in association with the requested service, and may provide data usage information (e.g., that identifies a quantity of data used) to AAA 240. Additionally, or alternatively, campaign enforcement device 230 and/or PGW 225 may provide an instruction, to AAA 240, that causes the data usage information to be charged to the content provider.

By using a redirected host name, dedicated to a deployed toll-free data service campaign for HTTPS-secured content, and a TLS handshake sequence to provide network security, mobile device 205 may receive HTTPS-secured content and the content provider may be charged for data usage associated with the HTTPS-secured content received by mobile device 205. By using traffic information, associated with redirected host names rather than host names, to identify toll-free data services, each campaign enforcement device 230 may reduce the amount of time required to detect traffic associated with a toll-free data service. For example, when host names are used, campaign enforcement device 230 may be required to establish a transport control protocol (TCP) session for each traffic flow with mobile device 205, and then tear down the traffic flow if the traffic flow is not associated with a toll-free data service. This may consume additional resources and may take more time than using traffic information to identify toll-free data services.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
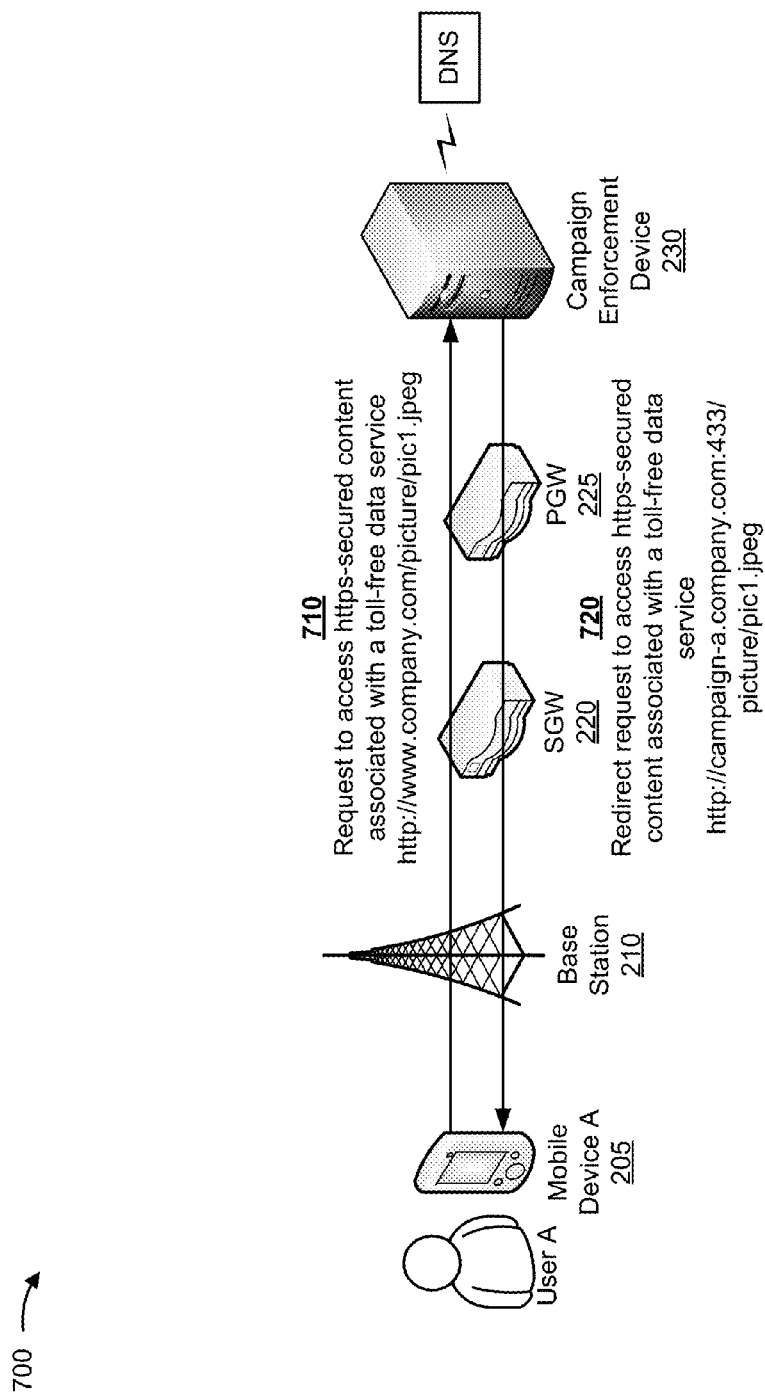
FIGS. 7A-7C are diagrams of an example implementation relating to the example process shown in FIG. 6.
Figure 7B:
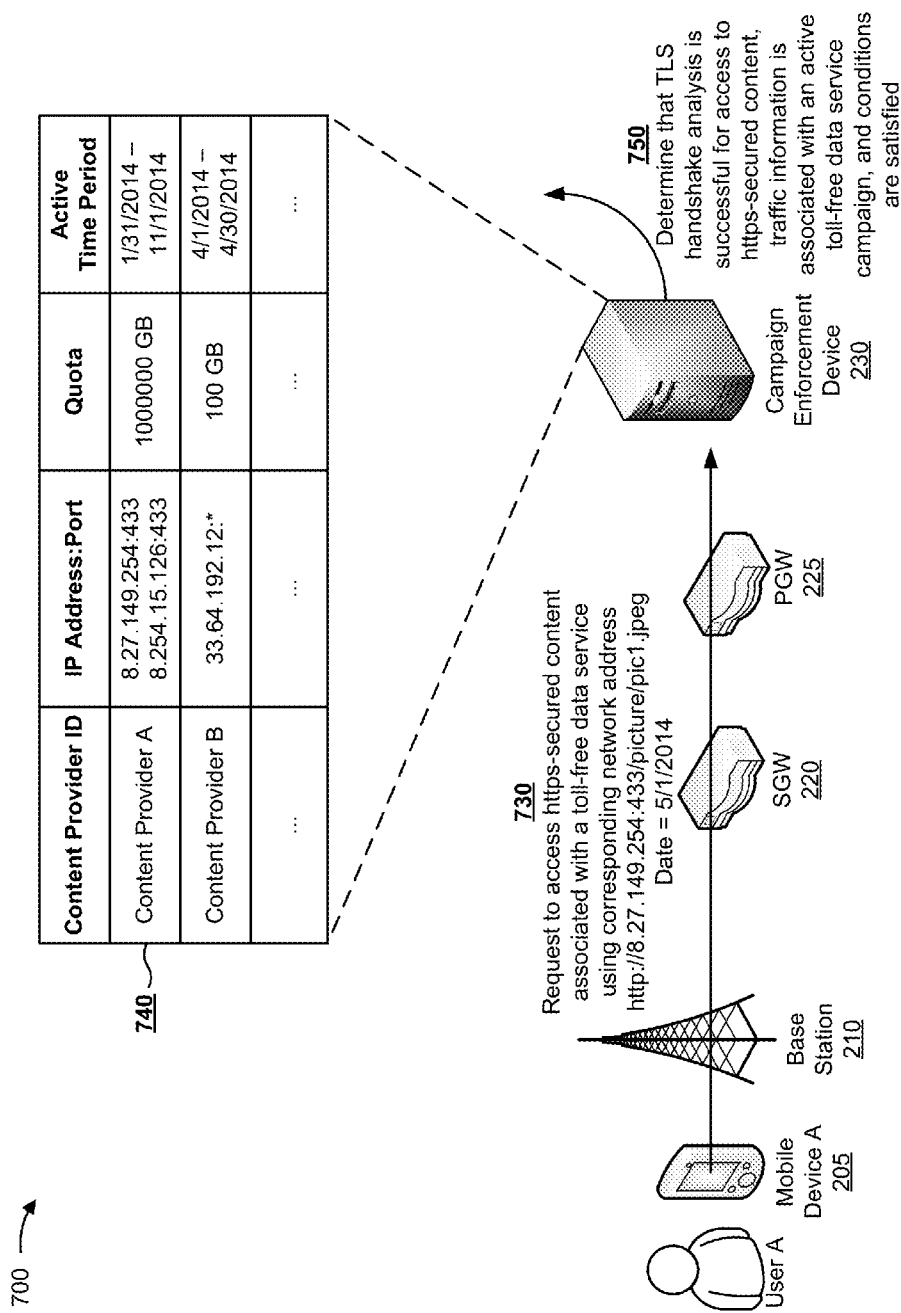
Figure 7C:
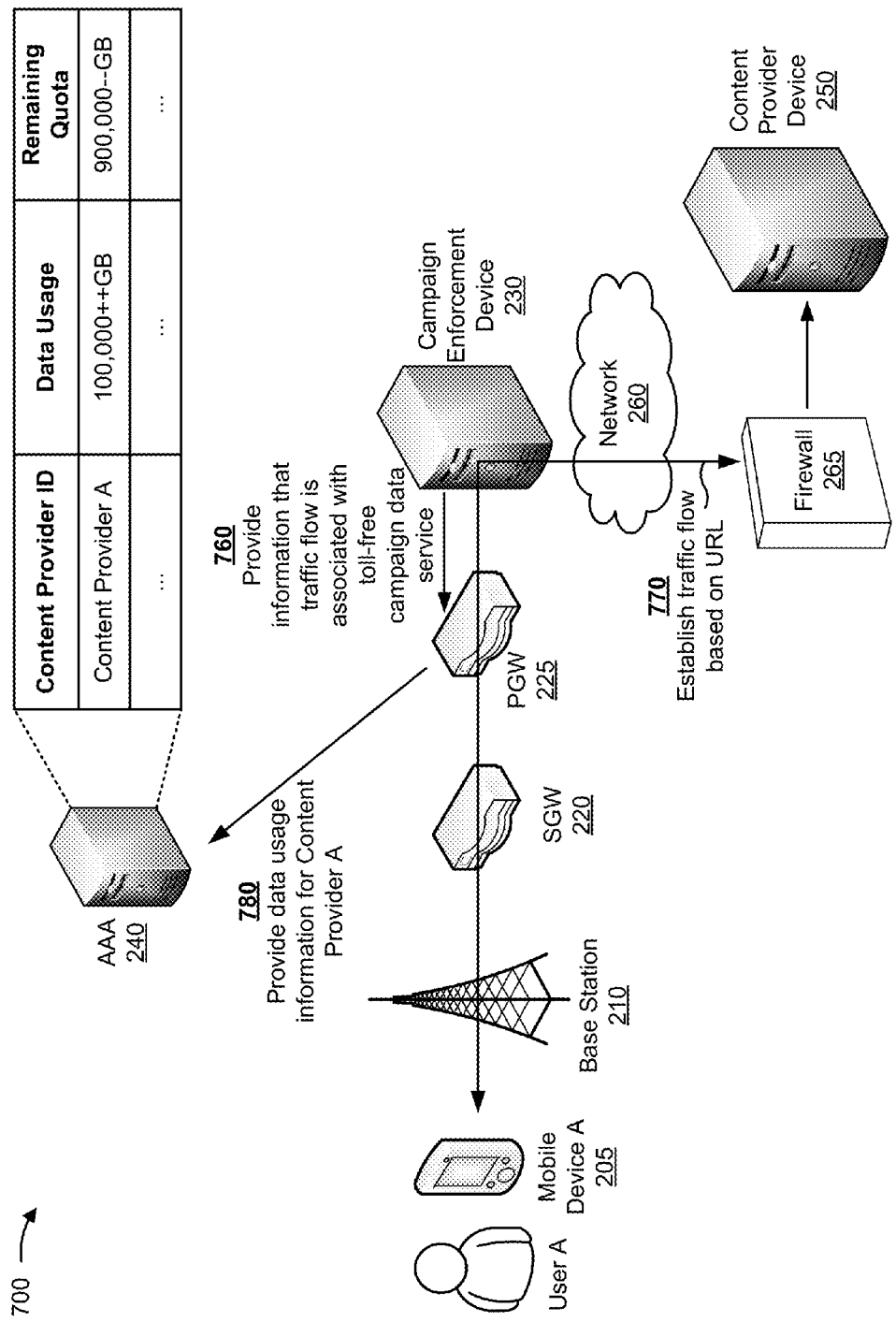

FIGS. 7A-7C are diagrams of an example implementation 700 relating to example process 600 shown in FIG. 6. FIGS. 7A-7C show an example of implementing a deployed toll-free data service campaign. For the purpose of FIGS. 7A-7C, assume that the operations described herein with respect to FIGS. 5A-5C have been performed.

As shown in FIG. 7A, and by reference number 710, assume that a user, shown as User A, interacts with Mobile Device A (e.g., mobile device 205) to fetch HTTPS-secured content. As further shown, assume that the request is an HTTPS request, and includes a URL (e.g., https://www.company.com/picture/pic1.jpeg). As shown in FIG. 7A, and by reference number 720, the content provider may recognize the request as a request for HTTPS-secured content associated with a deployed toll-free data service campaign and redirect the mobile device's request to a host name associated with the campaign (e.g., https://campaign-a.company.com:433/picture/pic1.jpeg).

As further shown in FIG. 7B, and by reference number 730, mobile device 205 may now fetch the redirected host name, using traffic information, for a toll-free data service by sending another HTTPS request, via campaign enforcement device 230. The request includes a URL with a network address "8.27.149.254" and a port identifier of "433." Further, assume that the date of the request is "5/1/2014." As further shown, assume that campaign enforcement device 230 receives the request and the URL with the network address and port identifier. As shown by reference number 740, assume that campaign enforcement device 230 compares the received network address and port identifier to a list of stored network addresses and port identifiers, and determines that the received network address and port identifier matches a stored network address and a stored port identifier.

Assume that campaign enforcement server 230 determines that an analysis of a TLS handshake between mobile device 205 and content provider device 250 is successful. Further, assume that campaign enforcement device 230 determines that all campaign conditions, associated with the toll-free data service, are satisfied. For example, assume that campaign enforcement device 230 determines that the date of the request is within the time period for the campaign. Thus, as shown by reference number 750, assume that campaign enforcement device 230 determines that the TLS handshake analysis is successful, the requested network address and port identifier are associated with an active toll-free data service, and the campaign conditions are satisfied.

As shown in FIG. 7C, and by reference number 760, assume that campaign enforcement device 230 provides information, to PGW 225, to mark packets, associated with a traffic flow so that Content Provider A (e.g., which provides the toll-free data service) can be charged for data usage. As shown by reference number 770, assume that PGW 225 assists in establishing the traffic flow between mobile device 205 (e.g., Mobile Device A) and content provider device 250 (e.g., identified in the request) via campaign enforcement device 230. As shown by reference number 780, assume that PGW 225 provides data usage information, for the traffic flow between Mobile Device A and content provider device 250, to AAA 240. Based on the received data usage information, assume that AAA 240 updates accounting information for Content Provider A, which indicates a quantity of bytes used by Mobile Device A in association with the established traffic flow. In this way, AAA 240 may charge a content provider for data usage when mobile device 205 requests a toll-free data service.

As indicated above, FIGS. 7A-7C are provided merely as an example. Other examples are possible and may differ from what was described with regard to FIGS. 7A-7C.

Implementations described herein utilize a redirected host name dedicated to a deployed toll-free data service campaign for HTTPS-secured content. The redirected host name and corresponding network address may be visible, even with the presence of a firewall, for purposes of charging the content provider, for data usage made by a user of a mobile device accessing the HTTPS-secured content. The HTTPS-secured content may be received by the mobile device after a successful transport layer security (TLS) handshake sequence between the mobile device and the content provider, via a campaign enforcement device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive, from a mobile device, a request to access secure content, associated with a toll-free campaign, from a content provider device,
the request including a first uniform resource identifier (URI);
redirect the mobile device to a second URI,
the second URI being associated with the first URI, and
the secure content, associated with the toll-free campaign, being designated as available via the second URI;
identify traffic information provided in the second URI;
compare the traffic information, provided in the second URI, with stored traffic information associated with the toll-free campaign;
determine that the traffic information, provided in the second URI, is associated with the toll-free campaign based on the traffic information, provided in the second URI, matching the stored traffic information;
determine that an analysis of a transport layer socket (TLS) handshake, performed by the mobile device and the content provider device, was successful for the toll-free campaign; and
provide information to cause data charges, for a traffic flow, to be charged to a content provider, associated with the toll-free campaign, based on:
determining that the traffic information, provided in the second URI, is associated with the toll-free campaign, and
determining that the analysis of the TLS handshake was successful.

2. The system of claim 1, where the one or more devices, are further to:
determine whether campaign conditions, associated with the toll-free campaign, are satisfied.

3. The system of claim 2, where the one or more devices are further to:
permit the mobile device to access the secure content associated with the toll-free campaign, based on the campaign conditions being satisfied.

4. The system of claim 2, where the one or more devices are further to:
deny the mobile device access to the secure content associated with the toll-free campaign, based on the campaign conditions not being satisfied; and
provide a notification, to the mobile device, indicating that access to the secure content, associated with the toll-free campaign, is not satisfied.

5. The system of claim 2, where, when determining whether the campaign conditions are satisfied, the one or more devices are to:
determine that the request to access the secure content associated with the toll-free campaign, is within a valid time period for the toll-free campaign, the valid time period being specified in the campaign conditions; and permit the mobile device to access the secure content, associated with the toll-free campaign, based on the request to access the secure content, associated with the toll-free campaign, being within the valid time period.

6. The system of claim 2, where, when determining whether the campaign conditions are satisfied, the one or more devices are to:

determine that the request to access the secure content, associated with the toll-free campaign, is received from a valid geographic region for the toll-free campaign, the valid geographic region being specified in the campaign conditions; and permit the mobile device to access the secure content associated with the toll-free campaign, based on the request to access the secure content, associated with toll-free campaign, being received from the valid geographic region.

7. The system of claim 2, where, when determining whether the campaign conditions are satisfied, the one or more devices are to:

determine that a quantity of bytes, allotted to the toll-free campaign, is available to meet the request to access the secure content associated with the toll-free campaign, the quantity of bytes, allotted to the toll-free campaign, being specified in the campaign conditions; and permit the mobile device to access the secure content, associated with the toll-free campaign, based on the quantity of bytes, allotted to the toll-free campaign, being available to meet the request to access the secure content associated with the toll-free campaign.

8. A computer-readable medium storing instructions, the instructions comprising:

one or more instructions that, when executed by one or more processors, cause the one or more processors to:

receive, from a mobile device, a corresponding uniform resource identifier (URI) for accessing secure content, associated with a toll-free campaign, from a content provider device, the corresponding URI being a redirect, by the content provider device, from an original URI provided by the mobile device, the original URI being provided in a request to access the secure content, and the corresponding URI being associated with the toll-free campaign;

identify traffic information provided in the corresponding URI;

compare the traffic information, provided in the corresponding URI, with stored traffic information associated with the toll-free campaign;

determine that the traffic information, provided in the corresponding URI, is associated with the toll-free campaign based on the traffic information, provided in the corresponding URI, matching the stored traffic information;

determine that an analysis of a transport layer socket (TLS) handshake, performed by the mobile device and the content provider device, was successful; and provide information to cause data charges, for a traffic flow, to be charged to a content provider, associated with the toll-free campaign, based on:

determining that the traffic information, provided in the corresponding URI, is associated with the toll-free campaign, and determining that the analysis of the TLS handshake was successful.

9. The computer-readable medium of claim 8, where the one or more instructions, when determining that the analysis of the TLS handshake was successful, cause the one or more processors to:

deny the mobile device access to the secure content, associated with the toll-free campaign, based on the analysis of the TLS handshake failing.

10. The computer-readable medium of claim 9, where the one or more instructions, when denying the mobile device access to the secure content, associated with the toll-free campaign, based on the TLS handshake failing, cause the one or more processors to:

provide a notification, to the mobile device, indicating that access to the secure content, associated with the toll-free campaign, is denied.

11. The computer-readable medium of claim 8, where the one or more instructions, when determining that the traffic information, provided in the corresponding URI, is associated with the toll-free campaign, cause the one or more processors to:

determine that the traffic information, provided in the corresponding URI, is not associated with the toll-free campaign; and provide information to cause data usage for the traffic flow to be charged to the mobile device based on determining that the traffic information, provided in the corresponding URI, is not associated with the toll-free campaign.

12. The computer-readable medium of claim 11, where the information, to cause the data usage for the traffic flow to be charged to the mobile device, is provided to at least one of:

a packet data network gateway, or an authentication, authorization, and accounting server (AAA).

13. The computer-readable medium of claim 8, where the one or more instructions, when determining that the analysis of the TLS handshake was successful, cause the one or more processors to:

inspect TLS handshake records associated with the TLS handshake;

parse the TLS handshake records for a TLS session identifier (SID) for the traffic flow;

create a map with the traffic information and the TLS SID for the traffic flow;

parse the TLS handshake records for a server name;

compare the server name with a stored server name associated with the toll-free campaign;

determine that the server name is associated with the toll-free campaign based on the server name matching the stored server name;

update the map to include a campaign identifier, associating the traffic flow, with the toll-free campaign based on the server name matching the stored server name; and output the map with the traffic information, the TLS SID for the traffic flow, and the campaign identifier.

14. The computer-readable medium of claim 13, where the one or more instructions that, when executed by the one or more processors, further cause the one or more processors to:

use the map to associate the traffic flow with the toll-free campaign.

15. The computer-readable medium of claim 13, where the one or more instructions that, when executed by the one or more processors, further cause the one or more processors to:

deny the mobile device access to the secure content, associated with the toll-free campaign, based on the server name not matching the stored server name; and provide a notification, to the mobile device, indicating that access to the secure content, associated with the toll-free campaign, is denied.

16. A method, comprising:

receiving, by a device, campaign conditions for enforcing a toll-free campaign;

receiving, by the device and from a mobile device, a request to access secure content, associated with the toll-free campaign, from a content provider device, the request including a first uniform resource identifier (URI);

redirecting, by the device, the mobile device to a second URI,
the second URI being associated with the first URI, and the secure content, associated with the toll-free campaign, being designated as available via the second URI;

identifying, by the device, traffic information provided in the second URI;

comparing, by the device, the traffic information, provided in the second URI, with stored traffic information associated with the toll-free campaign;

determining, by the device, that the traffic information, provided in the second URI, is associated with the toll-free campaign based on the traffic information, provided in the second URI, matching the stored traffic information;

determining, by the device, that an analysis of a transport layer socket (TLS) handshake, performed by the mobile device and the content provider device, was successful for the toll-free campaign;

determining, by the device, that the campaign conditions are satisfied; and providing, by the device, information to cause data charges, for a traffic flow, to be charged to a content provider, associated with the toll-free campaign, based on:

determining that the traffic information, provided in the second URI, is associated with the toll-free campaign, determining that the analysis of the TLS handshake was successful, and determining that the campaign conditions are satisfied.

17. The method of claim 16, where the secure content is HTTPS-secured content.

18. The method of claim 16, where determining that the analysis of the TLS handshake was successful, comprises:

inspecting TLS handshake records associated with the TLS handshake;

parsing the TLS handshake records for a TLS session identifier (SID) for the traffic flow;

creating a map with the traffic information and the TLS SID for the traffic flow;

parsing the TLS handshake records for a server name;

comparing the server name with a stored server name associated with the toll-free campaign;

determining that the server name is associated with the toll-free campaign based on the server name matching the stored server name;

updating the map to include a campaign identifier, associating the traffic flow with the toll-free campaign, based on the server name matching the stored server name; and outputting the map.

19. The method of claim 18, further comprising:

using the map to associate the traffic flow with the toll-free campaign.

20. The method of claim 18, further comprising:

denying the mobile device access to the secure content, associated with the toll-free campaign, based on the server name not matching the stored server name; and providing a notification, to the mobile device, indicating that access to the toll-free campaign is denied.

* * * * *